United States Patent [19]
Barton

[11] Patent Number: 5,140,225
[45] Date of Patent: Aug. 18, 1992

[54] HIGH FREQUENCY LAMP TRANSFORMER FOR LINEAR LIGHTING FIXTURE

[76] Inventor: Daniel W. Barton, 17170 Courtney La., Huntington Beach, Calif. 92649

[21] Appl. No.: 775,620

[22] Filed: Oct. 15, 1991

[51] Int. Cl.⁵ .................... H05K 5/00; H05B 41/14
[52] U.S. Cl. .................... 315/210; 315/250; 315/312; 362/221; 362/261; 361/377; 174/DIG. 2
[58] Field of Search .......... 315/210, 250, 312; 362/217, 221, 362, 263, 261; 361/377; 174/DIG. 2

[56] References Cited

U.S. PATENT DOCUMENTS

| | | | |
|---|---|---|---|
| 4,477,863 | 10/1984 | Walz | 362/362 X |
| 4,504,891 | 3/1985 | Mazis | 362/221 X |
| 4,674,015 | 6/1987 | Smith | 362/217 |
| 4,688,154 | 8/1987 | Nilssen | 315/312 X |
| 4,748,548 | 5/1988 | Barton | 362/249 |
| 4,924,152 | 5/1990 | Filickinger | 361/377 X |
| 5,107,186 | 4/1992 | Ihara | 174/DIG. 2 X |

Primary Examiner—Eugene R. LaRoche
Assistant Examiner—Do Hyum Yoo
Attorney, Agent, or Firm—Monty Koslover

[57] ABSTRACT

A lamp power transformer circuit which is packaged in a module housing having the same size, shape and cross section as a linear lighting fixture to which it is attached. The transformer circuit is designed to rectify input 60 Hz power and to switch the DC at a high frequency through a small stepdown magnetic transformer, to produce a lamp supply voltage of 12 volts, 30 KHz. The invention produces a light weigth lamp transformer, having a high operating efficiency, and sized for attaching to a previous invention, linear lighting fixture which incorporates low voltage halogen lamps.

10 Claims, 3 Drawing Sheets

Fig. 1.
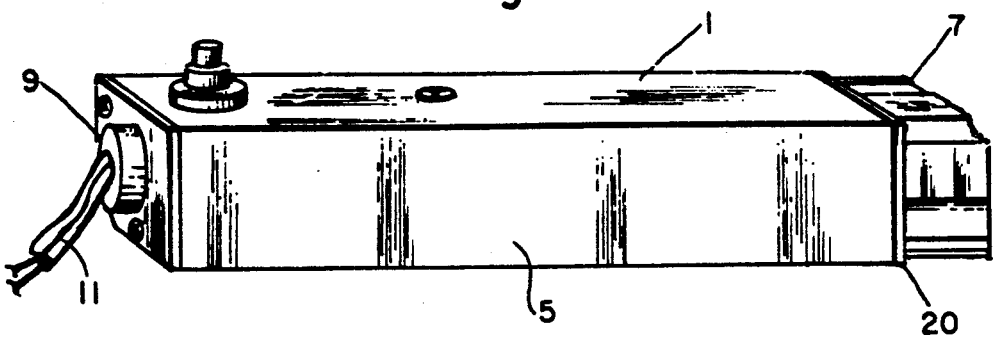
Fig. 2.
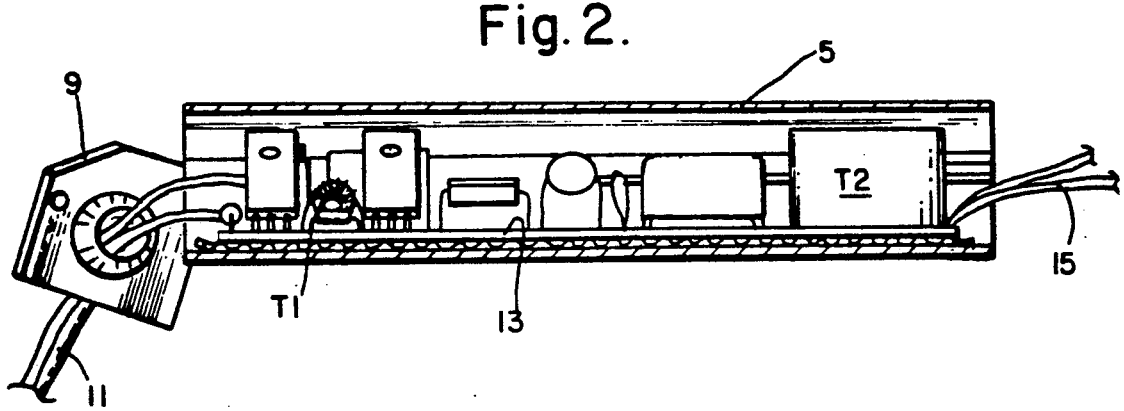
Fig. 3.
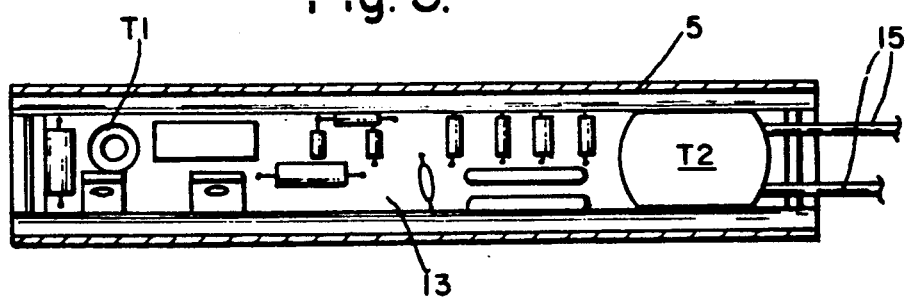
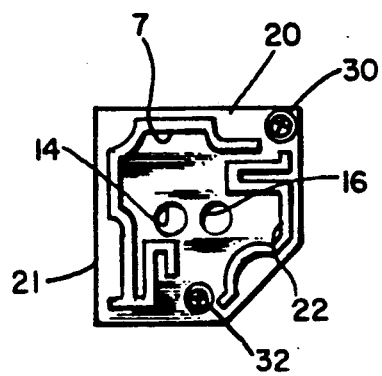
Fig. 4.
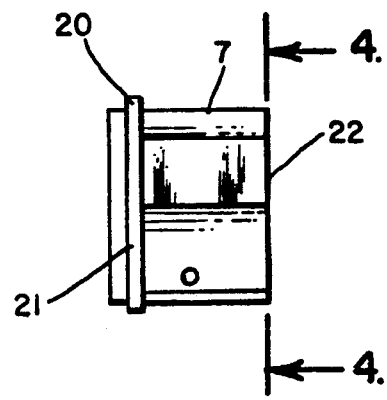
Fig. 5.

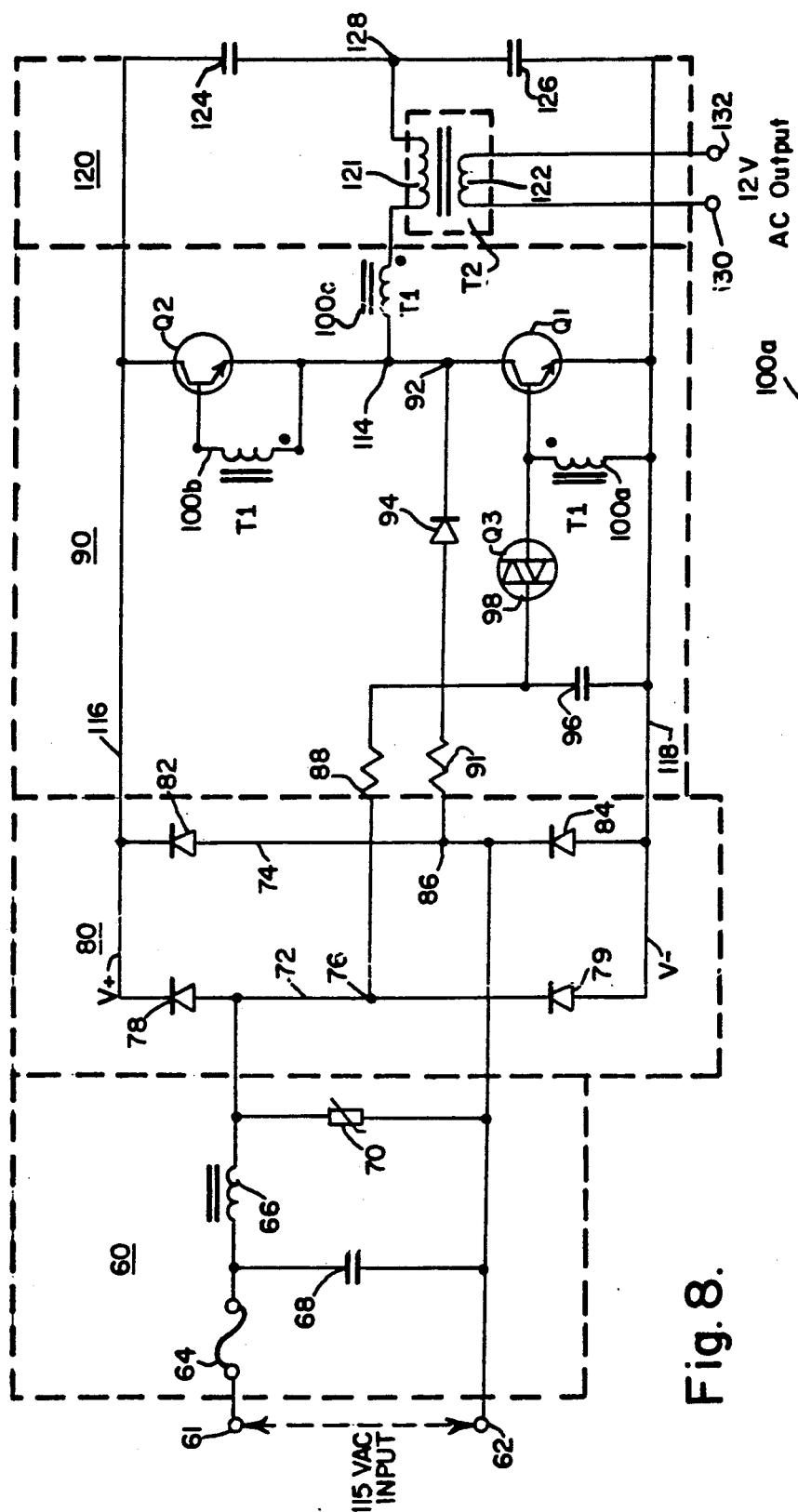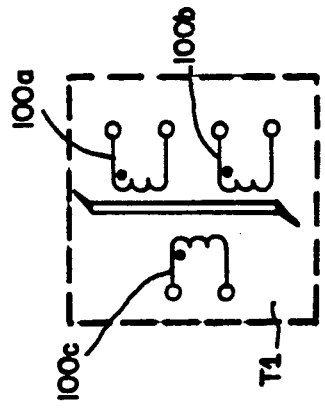
Fig. 8.
Fig. 9.

HIGH FREQUENCY LAMP TRANSFORMER FOR LINEAR LIGHTING FIXTURE

BACKGROUND AND SUMMARY OF THE INVENTION

This invention relates to a linear lighting fixture, and more particularly to an electronic high frequency power transformer to power the lamps in the linear lighting fixture.

The lighting fixture referred to is described in U.S. Pat. No. 4,748,548 entitled 'Lighting Fixture' by Daniel W. Barton. The patent discloses a linear lighting fixture which is adapted for use with low voltage halogen lamps. The main fixture comprises a substantially U-shaped cross-section member having a pair of longitudinal ridges near the extremities, and a plurality of identical light modules capable of being inserted at different portions on the elongated housing.

A conventional lamp transformer has been used with this lighting fixture to produce the required 12 volts AC from the input 115 volts AC, 60 Hz line. However, the transformer is large, heavy and inefficient, having significant heat dissipation. When installed, the transformer is generally kept away from the lighting fixture, particularly when used in show cases, because of the transformer characteristics.

There is therefore a need for a small, compact lamp power transformer which can fit with the linear lamp fixture in the available spaces and have low heat dissipation.

The present invention provides a lamp power transformer which is packaged in a module housing having the same size and shape cross-section as the linear lighting fixture, to which it is attached. Provision is made on the module for exact fitting into the linear lighting fixture, so that more than one transformer can be assembled at various locations along the linear lighting fixture. The transformer power circuit rectifies the input 60 Hz power and switches the DC at a high frequency, through a small transformer to produce a lamp supply voltage of approximately 12 volts AC, 30 kHz. The transformer power circuit is efficient (e.g. >95%), and will dissipate relatively little power. The module package is light, weighing typically less than one third the weight of the conventional transformers it replaces.

Accordingly, it is an object of the present invention to provide a power transformer for the linear lighting fixture that is light in weight and has high operating efficiency.

Another object is to permit placing one or more transformer modules directly in the linear lighting fixture installation as part of its assembly.

Further objects and advantages of the present invention will become apparent from the study of the following portion of the specification, the claims and the attached drawings.

BRIEF DESCRIPTION OF THE DRAWINGS

FIG. 1 is a perspective view of the lamp transformer module housing constructed according to the present invention;

FIG. 2 is a cut away side elevation view of the transformer module assembly, with the front wall and end sections removed, showing the electronic components of the power circuit;

FIG. 3 is a cut away plan view of the transformer module assembly, with the top wall and end sections removed, showing a typical layout of the electronic components on a circuit board;

FIG. 4 is an end elevation view of the module fixture connector, taken along line 4—4 of FIG. 5, particularly showing the shaped surfaces required for fitting to the linear lighting fixture;

FIG. 5 is a side elevation view of the module fixture connector;

FIG. 8 is a schematic of the transformer power circuit according to the present invention;

FIG. 9 is a schematic of the feedback pulse transformer T1 and useful in explaining the winding relationships in the power circuit of FIG. 8.

BRIEF DESCRIPTION OF THE PREFERRED EMBODIMENT

Referring particularly to the drawings, there are shown in FIGS. 1, 2 and 3, views of a lamp transformer module 1 constructed according to the principles of this invention, and designed to be fastened to a linear lighting fixture. This linear lighting fixture is disclosed in U.S. Pat. No. 4,748,548 "Lighting Fixture" which is incorporated herein by reference thereto.

Figure 6:
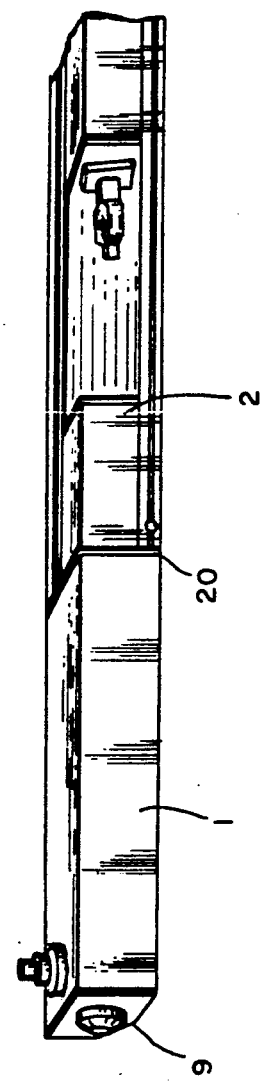
FIG. 6 is a perspective view of part of a linear lighting fixture, showing a present invention transformer module connected at one end of the fixture.

As illustrated in FIG. 1, the transformer module 1 is ready to be connected to one end of a linear lighting fixture 2. Such an arrangement is shown in FIG. 6.

The transformer module 1 comprises an elongated housing 5 made of extruded aluminum, a fixture connector 20, an end cover 9, a switch and a printed wiring board assembly (PWBA) 13. Multiple transformer modules 1 may also be designed to be inserted at various locations along a linear lighting fixture 2. For this configuration usage, the transformer module 1 comprises an elongated housing 5, two fixture connectors 20 (one at each end), a switch and a printed wiring board assembly (PWBA) 13. An end cover 9 is not needed for this configuration.

The elongated module housing 5 has a corner-truncated square cross-section with five planar surfaces; one surface truncating a rectangle corner for a short length at 45 deg. to each of its adjacent sides, and the remaining four surfaces at right angles to each other. The cross-section of the housing 5 is shaped and sized to match that of the assembled linear lighting fixture 2, so that it can fit in line with the lighting fixture 2.

Refer now to FIGS. 2 and 3 which show cut away module views of the printed wiring board assembly (PWBA) 13 inside a module housing 5. On the PWBA are mounted all the electronic components except for the switch, which is mounted on the module housing 5. Both the pulse transformer T1 and the stepdown transformer T2 are small enough to fit comfortably on the board and inside the housing 5. The input electrical wiring 11 passes through a hole in the end cover 9 and is connected to the PWBA 13 input terminals and the switch. Output power wiring 15 is connected to the output terminals of the PWBA 13 at transformer T2.

FIGS. 4 and 5 show two views of the fixture connector 20 which is illustrated as being attached to the right end of the transformer module in FIG. 1. FIG. 5 is a side elevation view of the connector 20 and FIG. 4 is an end view taken along line 4—4 of FIG. 5. The connector 20 is a molded part comprising a base 21 to which are attached two projecting shaped surface portions 7 and 22. These projecting portions 7, 22 extend out from the base a length of about ⅜ inch. It can be seen that the shaped surface portions 7 and 22 of the connector are shaped with curves and flats that will fit inside the housing of the linear lighting fixture 2 and grasp it. The material of the connector is a hard molded plastic, selected for flexibility with sufficient firmness.

A first hole 14 and second hole 16 are formed in the base 21 of the connector to permit electrical wiring to pass through. Two more holes 30 and 32 are formed near the edges of the base 21 to accommodate screws used to fasten the connector 20 to the end of the module housing 5.

Figure 7:
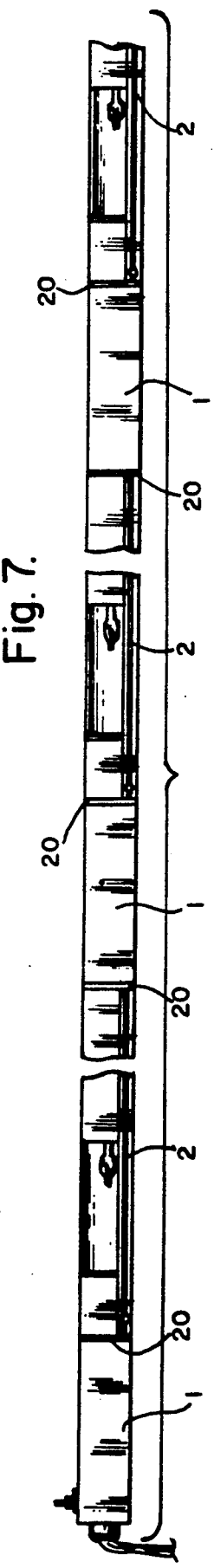
FIG. 7 is a partial side elevation view of a linear lighting fixture, particularly showing the addition of three lamp transformer modules, assembled and placed at various locations along the lighting fixture.

Refer now to FIGS. 6 and 7. In FIG. 6, a transformer module 1 is attached, using a connector 20 to one end of a linear lighting fixture 2. Each transformer module is rated to supply a maximum of four halogen lamps in the fixture, so that a linear lighting fixture 2 having four lamps can be powered in this manner. If a lighting fixture having more than four lamps needed to be powered, a number of transformer modules 1 corresponding to the multiple of four lamps in the lighting fixture would be required. Just such an arrangement is illustrated in FIG. 7.

In FIG. 7, three transformer modules 1 are shown inserted, and connected 20 in place in a linear lighting fixture 2. One module is located at the extreme end of the fixture, and utilizes an end cap 9, to finish and cover the end. The remaining modules 1 each utilize fixture connectors 20 at each end. In the configuration shown, up to twelve halogen lamps are powered. The number of lamps powered may, of course be increased by adding the requisite transformer modules in line.

The power circuit components are mounted on the printed wiring board assembly 13. These components must be selected and connected in a specific manner in order to produce the desired power output. The necessary design of the power circuit is now presented.

Referring now to FIG. 8, there is shown a schematic of the lamp transformer circuit used in this invention.

The lamp transformer circuit is characterized by its transforming a low frequency (60 Hz), high voltage (115 VAC) input into a high frequency (30 KHz), low voltage (12 VAC) output. In order to do this, the circuit is constructed with four functional sections or areas. These are: an input protection circuit 60, a bridge rectifier 80, a firing/oscillating circuit 90 and an output circuit 120. A 60 Hz 115 VAC input is connected across the input terminals 61, 62.

The input protection circuit comprises a fuse 64 and inductor 66 connected in series to one input terminal 61, and a bypass capacitor 68 and MOV varistor 70 connected in parallel at each end of the inductor 66, and to the bus connecting to input terminal 62. The fuse serves to provide protection against any significant input overcurrents. The bypass capacitor 68 and inductor 66 form an L-C filter having values selected to resonate in the frequency range of 40 KHz to 50 KHz, and serving to reduce any switching noise that may be reflected back into the AC power line. An MOV varistor 70 is used to clamp transient voltage spikes which may occur on the AC input power line and possibly cause failure in the circuit switching components.

The input protection circuit 60 is connected to the two paralleled half bridges which comprise the bridge rectifier 80. The input inductor 66 being connected to the center of the first half bridge 72, and input terminal 62 being connected to the center of the second half bridge 74. Each half bridge 72, 74, is formed of two series diodes each, 78, 79 and 82, 84. In each half bridge, the cathodes of the upper diodes 78, 82 are tied together to form a positive bus 116 designated V+, and the anodes of the lower diodes 79, 84 are tied to form a negative bus 118 designated V—.

The bridge rectifier 80 functions to take the AC input line voltage, which alternates between positive and negative polarities, and to produce only a positive voltage at the V+ bus with respect to the V— bus, for the use of the switching transistors in the firing/oscillating circuit. There is no need to turn the full wave output into a pure DC level, so no large filter capacitors are required in this instance.

The oscillating circuit portion of the firing/oscillating circuit 90, comprises a first transistor Q1 and a second transistor Q2 arranged in an oscillator circuit mode, with a feedback pulse transformer T1 providing positive feedback. The relationship of T1 primary to secondaries is illustrated in FIG. 9.

The firing circuit is made up of a first resistor 88 and a second capacitor 96 connected in series; a second resistor 91 and a fifth diode 94 connected in series, and a bidirectional switch 98. The first resistor 88 is connected to the center 76 of the first rectifier leg 72, and the second capacitor 96 is connected to the negative V— bus 118. The second capacitor 96 serves as a timing capacitor. It is maintained charged by currents through both first and second resistors 88 and 91, which are connected to it.

Operation of the firing/oscillating circuit 90 is as follows: At the start, the DC voltage from base to emitter of first transistor Q1 before oscillation starts, is zero. As the input AC line voltage, and hence the rectified voltage from V+ to V—, increases from zero, one of the AC input lines will be positive with respect to the V— line. Thus, a positive voltage source will produce a charging current through either first resistor 88 or second resistor 91 to charge the timing capacitor 96. After about 600 usec, the voltage across the capacitor will reach the critical 8 V level, where a small current begins to flow through the bidirectional switch 98. The current flow will increase and as the trigger current level of the switch 98 is exceeded, it triggers suddenly and its terminal voltage drops to about 0.7 V. When this happens, the 8 V charge across the timing capacitor 96 is dumped and flows through the switch 98 and into the base of the first transistor Q1, turning it on.

When the first transistor Q1 is turned on, a base-emitter voltage is applied to a secondary winding 100a of pulse transformer T1. This in turn, produces a coupled voltage across the other secondary winding 100b, which is across second transistor Q2, making its base negative with respect to its emitter, thus preventing the second transistor from turning on.

As first transistor Q1 is on, current flows through the primary 121 of the output transformer T2 and a current will flow in the T2 secondary 122 due to the coupled resistance of the load. The T2 primary current also flows through the primary coil 100c of pulse transformer T1, with such polarity as to induce further positive base current flow in the first transistor Q1 from coupled T1 secondary 100a in a regenerative action.

After a short time, the core of pulse transformer T1 saturates. Current is no longer coupled into the base of first transistor Q1 and it ceases conduction. The energy stored in the saturated core of T1 induces a base current in T1 secondary 100b as the flux falls. This begins to turn second transistor Q2 on.

As second transistor Q2 conducts, its collector and emitter are effectively shorted, placing the voltage across third capacitor 124, which is in parallel, directly across the primary 121 of output transformer T2. The polarity is opposite to that which existed before when transistor Q1 was conducting. Current flows through the primary 121 of T2 and the primary 100c of pulse transformer T1 in a polarity to apply a reverse bias, coupled through T1 secondary 100a, to transistor Q1. A forward bias is coupled through T1 secondary 100b, applying to the base of second transistor Q2, to enhance and maintain its turn-on. Transistor Q2 continues to be driven on until the core of pulse transformer T1 again saturates in the opposite direction.

Oscillation continues, with transistors Q1 and Q2 being alternately turned on until there is insufficient current flowing in the load, and hence reflected in the primary of output transformer T2 to drive the base of the next transistor. The frequency of oscillation is determined by the saturation characteristics of the core in transformer T1. For a 30 KHz oscillation frequency, the core is selected to saturate in about 17 usec. This frequency is desirable so as to enable reduction of the size of the output transformer to its practical minimum.

The circuit described above has a further advantage in that the short interval where both transistors conduct simultaneously is greatly reduced, as compared with commonly known oscillator schemes, thus reducing greatly power dissipation in the transistors Q1 and Q2.

Figure 10:
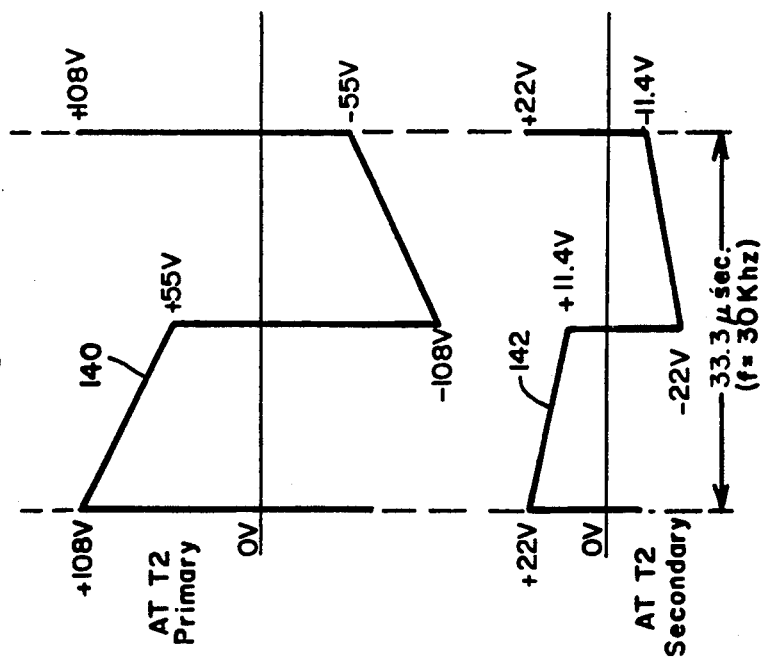
FIG. 10 illustrates the voltage waveforms at the stepdown transformer T2 primary and secondary, showing the voltage and frequency that powers the lamps.

In the output circuit 120, in addition to the output stepdown transformer T2, two bridge capacitors 124 and 126 are provided. The capacitors are connected across the V+ bus and the V− bus, and provide some filter action. However, their prime function is to insure that a balanced line current will flow in the T2 primary for each state of the oscillator circuit. The primary and secondary output voltage waveforms of T2 are not sinusoidal. As shown in the waveforms in FIG. 10, they are approximate square waves. There is little rounding off due to filtering.

The voltage output at the T2 terminals 130, 132, will be about 12 Vac. The voltages will vary according to the actual instantaneous line voltage. For the application load intended, a halogen lamp, the high frequency wave shape is considered to be acceptable and practical.

The result of the above design of a high frequency power transformer circuit, is that the transformation is efficient, with power losses in the order of five percent or less. Heat dissipation will thus be small. In addition, the circuit components are small and light weight, permitting their mounting on a printed wiring board and insertion in a module housing sized to match a linear lighting fixture.

From the foregoing description, it is believed that the preferred embodiment achieves the objects of the present invention. Alternative embodiments and modifications will be apparent to those skilled in the art. These and other modifications are considered to be equivalent and within the spirit and scope of this invention.

Having described the invention, what is claimed is:

1. A lamp transformer module for use assembled with a linear lighting fixture; said lamp transformer module comprising:
   an elongated module housing;
   a lighting fixture connector which is attached to one end of said module housing;
   an end cover, which is attached by screws to the opposite end of said module housing from said fixture connector;
   a printed wiring board assembly, which is mounted inside said elongated module housing; said printed wiring board assembly comprising a printed wiring board and a transformer power circuit mounted on said board; and
   a switch mounted on an external surface of said module housing; said switch being connected to input AC power lines connecting to said transformer power circuit;
   said fixture connector in said module housing being configured to enable fitting said module housing in line with the linear lighting fixture;
   said transformer power circuit being configured to transform input 115 Vac, 60 Hz power to 12 Vac, 30 KHz power for low voltage halogen lamps in said linear lighting fixture.

2. A lamp transformer module according to claim 1 wherein:
   said elongated module housing is constructed of extruded aluminum; said module housing having a cross-section that is a corner-truncated square shape, having five planar surfaces, one surface being at 45 degrees angle to each of its adjacent surfaces, and the remaining surfaces being at right angles to each other; said housing cross-section being sized and shaped to mate with and fit in line with said linear lighting fixture.

3. A lamp transformer module according to claim 1 wherein: said lighting fixture connector is made of a molded, hard plastic material; said connector comprising a base and two projecting, shaped surface portions attached to said base, said shaped surface portions being arranged with curves and flat surfaces that are sized and shaped to fit snugly inside against the housing walls of said linear lighting fixture; said base portion having formed in it, a first and second hole to accommodate the passage of electrical wiring; said base portion also having a third and fourth hole formed near its edges to accommodate screws for fastening said connector to said elongated module housing.

4. A lamp transformer module according to claim 1 wherein:
   said transformer power circuit on said printed wiring board comprises:
   an input protection circuit;
   a bridge rectifier, connected to said input protection circuit, and providing a dc output;
   a firing/oscillating circuit, connected to said bridge rectifier; said firing/oscillating circuit providing high frequency (30 KHz) output power at its output terminals; and
   an output circuit, connected to said output power terminals of said firing/oscillating circuit; said output circuit stepping down the input voltage to produce a nominal 12 Vac, 30 KHz output for supply to the low voltage halogen lamps in said linear lighting fixture.

5. The transformer power circuit of claim 4 wherein:

said input protection circuit comprises a fuse and inductor which are connected in series to a first input power terminal, and a bypass capacitor and MOV varistor which are connected in parallel to each end of said inductor and also to a second input power terminal;

said fuse providing protection against significant input overcurrents; said bypass capacitor and inductor forming an L-C filter and serving to reduce any switching noise that may be reflected back into the input AC power lines said MOV varistor for the purpose of clamping any transient voltage spikes that may occur on the input AC power lines and providing protection for switching components in the firing/oscillating circuit.

6. A lamp transformer module for use assembled with a linear lighting fixture; said lamp transformer module comprising:

an elongated module housing;

two lighting fixture connectors, which are attached one to each end of said module housing;

a printed wiring board assembly, which is mounted inside said elongated module housing; said printed wiring board assembly comprising a printed wiring board and a transformer power circuit mounted on said board; and a switch mounted on an external surface of said module housing; said switch being connected to input AC power lines connecting to said transformer power circuit;

said fixture connectors attached to said module housing, enabling the fitting of said transformer module in any of multiple locations in line with said linear lighting fixture;

said transformer power circuit being configured to transform input 115 Vac, 60 Hz power to 12 Vac, 30 KHz power for low voltage halogen lamps in said linear lighting fixture.

7. A lamp transformer module according to claim 6 wherein:

said elongated module housing is constructed of extruded aluminum; said module housing having a cross-section that is a corner-truncated square shape, having five planar surfaces, one surface being at 45 degrees angle to each of its adjacent surfaces, and the remaining surfaces being at right angles to each other; said housing cross-section being sized and shaped to mate with and fit in line with said linear lighting fixture.

8. A lamp transformer module according to claim 6 wherein:

said lighting fixture connectors are made of a molded, hard plastic material; said connectors each comprising a base and two projecting, shaped surface portions attached to said base, said shaped surface portions being arranged with curves and flat surfaces that are sized and shaped to fit snugly inside against the housing walls of said linear lighting fixture; said base portion having formed in it, a first and second hole to accommodate the passage of electrical wiring; said base portion also having a third and fourth hole formed near its edges to accommodate screws for fastening said connector to said elongated module housing.

9. A lamp transformer module according to claim 6 wherein:

said transformer power circuit on said printed wiring board comprises: an input protection circuit;

a bridge rectifier, connected to said input protection circuit, and providing a dc output;

a firing/oscillating circuit, connected to said bridge rectifier; said firing/oscillating circuit providing high frequency (30 KHz) output power at its output terminals; and an output circuit, connected to said output power terminals of said firing/oscillating circuit; said output circuit stepping down the input voltage to produce a nominal 12 Vac, 30 KHz output for supply to the low voltage halogen lamps in said linear lighting fixture.

10. The transformer power circuit of claim 9 wherein:

said input protection circuit comprises a fuse and inductor which are connected in series to a first input power terminal, and a bypass capacitor and MOV varistor which are connected in parallel to each end of said inductor and also to a second input power terminal;

said fuse providing protection against significant input overcurrents; said bypass capacitor and inductor forming an L-C filter and serving to reduce any switching noise that may be reflected back into the input AC power lines said MOV varistor for the purpose of clamping any transient voltage spikes that may occur on the input AC power lines and providing protection for switching components in the firing/oscillating circuit.

* * * * *